United States Patent
Georgiadis et al.

(10) Patent No.: US 11,475,308 B2
(45) Date of Patent: Oct. 18, 2022

(54) JOINTLY PRUNING AND QUANTIZING DEEP NEURAL NETWORKS

(71) Applicant: Samsung Electronics Co., Ltd., Suwon-si (KR)

(72) Inventors: Georgios Georgiadis, Porter Ranch, CA (US); Weiran Deng, Woodland Hills, CA (US)

(73) Assignee: SAMSUNG ELECTRONICS CO., LTD.

( * ) Notice: Subject to any disclaimer, the term of this patent is extended or adjusted under 35 U.S.C. 154(b) by 809 days.

(21) Appl. No.: 16/396,619

(22) Filed: Apr. 26, 2019

(65) Prior Publication Data

US 2020/0293893 A1    Sep. 17, 2020

Related U.S. Application Data (60) Provisional application No. 62/819,484, filed on Mar. 15, 2019.

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
None
See application file for complete search history.

(56) References Cited

U.S. PATENT DOCUMENTS

| | | |
|---|---|---|
| 2017/0286830 A1 | 10/2017 | El-Yaniv et al. |
| 2018/0046915 A1 | 2/2018 | Sun et al. |
| 2018/0253401 A1 | 9/2018 | Cardinaux et al. |
| 2018/0285736 A1 | 10/2018 | Baum et al. |
| 2018/0300600 A1 | 10/2018 | Ma et al. |

OTHER PUBLICATIONS

Manessi et al., Automated Pruning for Deep Neural Network Compression, 2018 24th International Conference on Pattern Recognition (ICPR) Beijing, China, Aug. 20-24, 2018; pp. 657-664 (Year: 2018).*

(Continued)

*Primary Examiner* — Alan Chen
(74) *Attorney, Agent, or Firm* — Renaissance IP Law Group LLP (57) ABSTRACT

A system and a method generate a neural network that includes at least one layer having weights and output feature maps that have been jointly pruned and quantized. The weights of the layer are pruned using an analytic threshold function. Each weight remaining after pruning is quantized based on a weighted average of a quantization and dequantization of the weight for all quantization levels to form quantized weights for the layer. Output feature maps of the layer are generated based on the quantized weights of the layer. Each output feature map of the layer is quantized based on a weighted average of a quantization and dequantization of the output feature map for all quantization levels. Parameters of the analytic threshold function, the weighted average of all quantization levels of the weights and the weighted average of each output feature map of the layer are updated using a cost function.

20 Claims, 7 Drawing Sheets

(56) References Cited

OTHER PUBLICATIONS

Tung et al., CLIP-Q: Deep Network Compression Learning by In-Parallel Pruning-Quantization, 2018 IEEE/CVF Conference on Computer Vision and Pattern Recognition; pp. 7873-7882 (Year: 2018).*

Han et al., Deep Compression: Compressing Deep Neural Networks With Pruning, Trained Quantization and Huffman Coding, arXiv:1510.00149v5 [cs.CV] Feb. 15, 2016 (Year: 2016).*

Rathi et al., STDP Based Pruning of Connections and Weight Quantization in Spiking Neural Networks for Energy-Efficient Recognition, IEEE Transactions on Computer-Aided Design of Integrated Circuits and Systems, 2018; Total pp. 10 (Year: 2018).*

* cited by examiner

JOINTLY PRUNING AND QUANTIZING DEEP NEURAL NETWORKS

CROSS-REFERENCE TO RELATED APPLICATION

This application claims the priority benefit under 35 U.S.C. § 119(e) of U.S. Provisional Application No. 62/819,484 filed on Mar. 15, 2019, the disclosure of which is incorporated herein by reference in its entirety.

TECHNICAL FIELD

The subject matter disclosed herein relates to neural networks. More specifically, the subject matter disclosed herein relates to a system and a method that jointly prunes the weights and quantizes the weights and output feature maps of a layer of a neural network.

BACKGROUND

The weights and output feature maps of the activation functions occupy a huge amount of memory during an inference phase of a deep neural network (DNN). Neural networks also use a huge amount of operations to compute the output inference. Pruning of the weights and quantization of the weights and output feature maps of the activation functions may reduce the memory requirements and amount of computation of neural networks.

A conventional approach to pruning and quantizing a neural network is to first prune and then quantize the neural network as separate independent operations. See, for example, S. Han et. al., "Deep Compression: Compressing Deep Neural Networks with Pruning, Trained Quantization and Huffman Coding," arxiv.org/1510.00149). The effect of the separate operations disclosed by Han et al. is that the quantization portion receives a pruned network, which makes optimizing of the quantization parameters harder. In effect, the pruning shrinks the allowable state-space of the network by only considering one available pruned model of the neural network.

SUMMARY

An example embodiment provides a neural network that may include a plurality of layers in which at least one layer may include jointly pruned and quantized weights and output feature maps. The jointly pruned weights may be pruned using an analytic threshold function. Each weight remaining after being pruned may further be quantized based on a weighted average of a quantization and dequantization of the weight for all quantization levels. The output feature maps may be formed based on the pruned and quantized weights of the layer. Each output feature map may be quantized based on a weighted average of a quantization and dequantization of the output feature map for all quantization levels, and parameters of the analytic threshold function. The weighted average of all quantization levels of the weights and the weighted average of each output feature map of the layer may be updated based on a cost function. In one embodiment, the neural network is a full-precision trained neural network before the weights and the output feature maps of the at least one layer are jointly pruned and quantized. In another embodiment, the cost function includes a pruning loss term, a weight quantization loss term and a feature map quantization loss term.

An example embodiment provides a method to prune weights and output feature maps of a layer of a neural network that may include pruning weights of a layer of a neural network using an analytic threshold function, the neural network being a trained neural network; quantizing each weight of the layer remaining after pruning based on a weighted average of a quantization and dequantization of the weight for all quantization levels to form quantized weights for the layer; determining output feature maps of the layer based on the quantized weights of the layer; quantizing each output feature map of the layer based on a weighted average of a quantization and dequantization of the output feature map for all quantization levels; and updating parameters of the analytic threshold function, the weighted average of all quantization levels of the weights and the weighted average of each output feature map of the layer using a cost function. In one embodiment, updating the parameters of the analytic threshold function, the weighted average of all quantization levels of the weights and the weighted average of each output feature map of the layer further comprises optimizing the cost function.

An example embodiment provides a neural network analyzer that may include an interface and a processing device. The interface may receive a neural network that may include a plurality of layers. The processing device may generate a neural network that may include at least one layer having weights and output feature maps that have been jointly pruned and quantized. The processing device may prune the weights of the at least one layer of the neural network using an analytic threshold function, quantize each weight of the at least one layer remaining after pruning based on a weighted average of a quantization and dequantization of the weight for all quantization levels to form quantized weights for the at least one layer, determine output feature maps of the at least one layer based on the quantized weights of the at least one layer, quantize each output feature map of the at least one layer based on a weighted average of a quantization and dequantization of the output feature map for all quantization levels, and update parameters of the analytic threshold function, the weighted average of all quantization levels of the weights and the weighted average of each output feature map of the at least one layer using a cost function. In one embodiment, the interface further outputs the neural network that includes at least one layer having weights and output feature maps that have been jointly pruned and quantized.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provide joint pruning and quantization that allows the optimization of a neural network to select the pruned model that is best for quantization and at the same time, select the quantized model that is best for pruning. Accordingly, the subject matter disclosed herein allows a much larger set of allowable solutions to be considered, thereby providing better pruning and quantization results.

Figure 1:
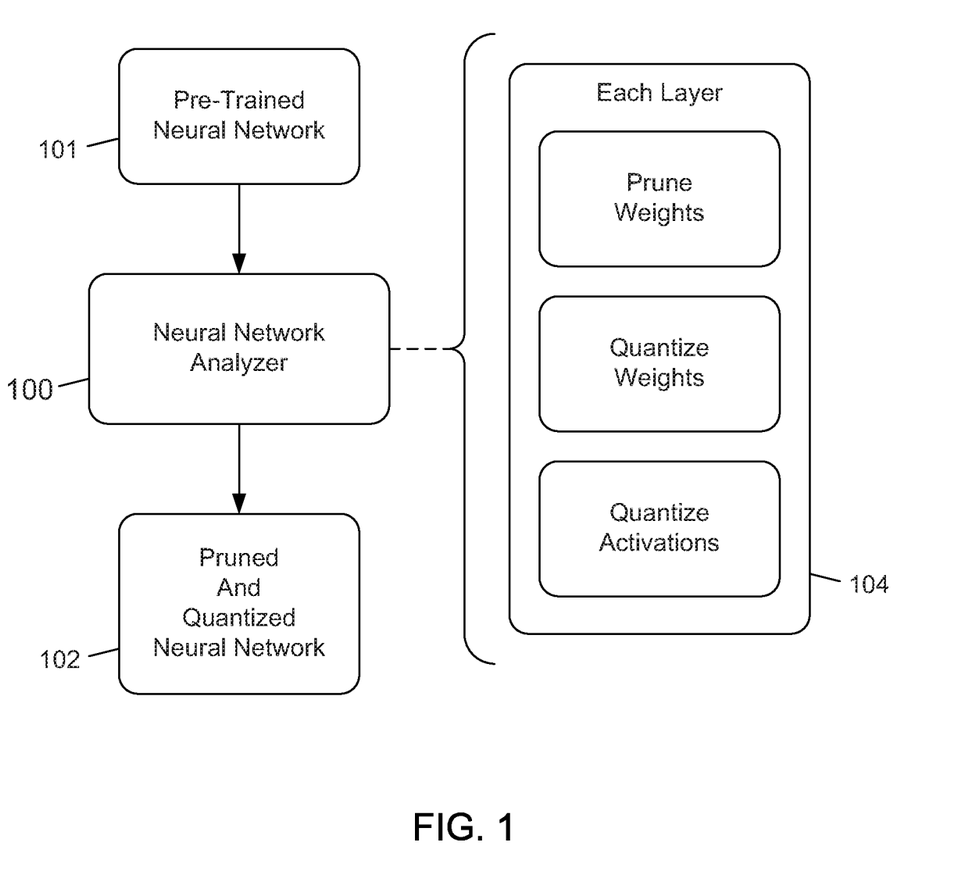
FIG. 1 depicts a block diagram of a neural network analyzer that may perform a joint pruning and quantization operation on the layers of a deep neural network (DNN) according to the subject matter disclosed herein.

FIG. 1 depicts a block diagram of a neural network analyzer 100 that may perform a joint pruning and quantization operation on the layers of a deep neural network (DNN) according to the subject matter disclosed herein. In one example embodiment, the neural network analyzer 100 may be implemented as a data-processing system executing suitable software. As depicted, the neural network analyzer 100 may receive a full-precision trained neural network 101 as an input. The neural network analyzer 100 may operate on the layers of the neural network 101 by performing a joint pruning and quantization operation 104 on the weights and the output feature maps of each respective layer of the neural network 101. The neural network analyzer 100 outputs a neural network 102 in which the layers of the neural network have been jointly pruned and quantized.

The joint pruning and quantization operation 104 that is performed on each layer may include multiple forward and backward passes, or iterations, that fine tune the pruned and quantized weights and output feature maps for each respective layer of a DNN. During a forward pass through a layer of the DNN, the weights are pruned, then quantized. The output feature maps are then computed using the quantized weights. The output feature maps are then quantized. During a backward pass, the pruning parameters and the parameters for quantizing the pruned weights and the output feature maps are updated based on an optimization of a cost function.

Figure 2:
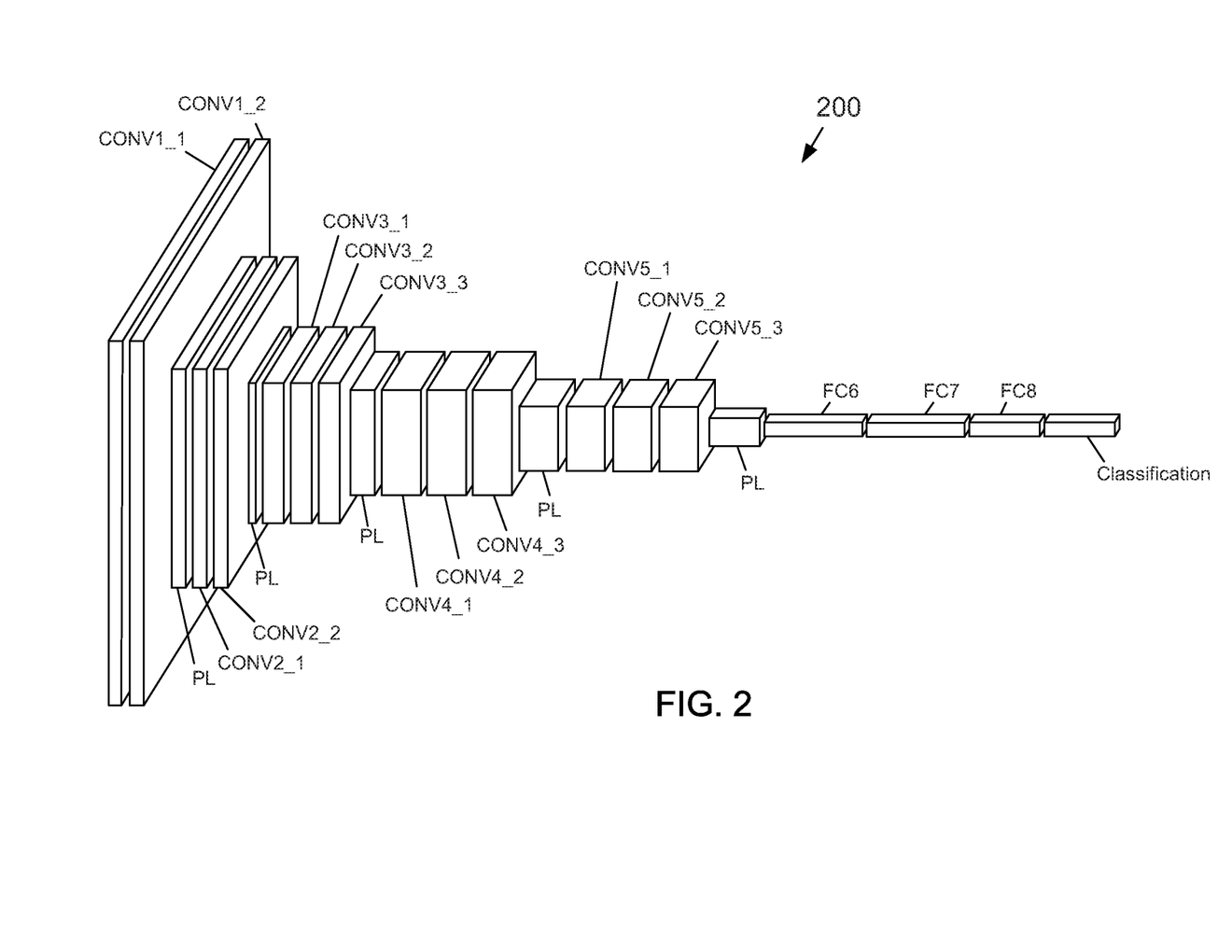
FIG. 2 depicts an example architecture of a DNN that may be input to the neural network analyzer of FIG. 1 as a full-precision trained neural network.

In one embodiment, the full-precision trained neural network 101 and the pruned and quantized neural network 102 may be DNNs. FIG. 2 depicts an example architecture 200 of a DNN that may be input to the neural network analyzer 100 as a full-precision trained neural network 101. The example architecture 200 of the VGG 16 specifically includes 13 convolutional (CONV) layers, three fully connected (FC) layers, and five pooling layers (PLs). An input to the VGG 16 architecture 200 is applied to convolutional layer CONV1_1, and an output is provided at Classification.

Figure 3:
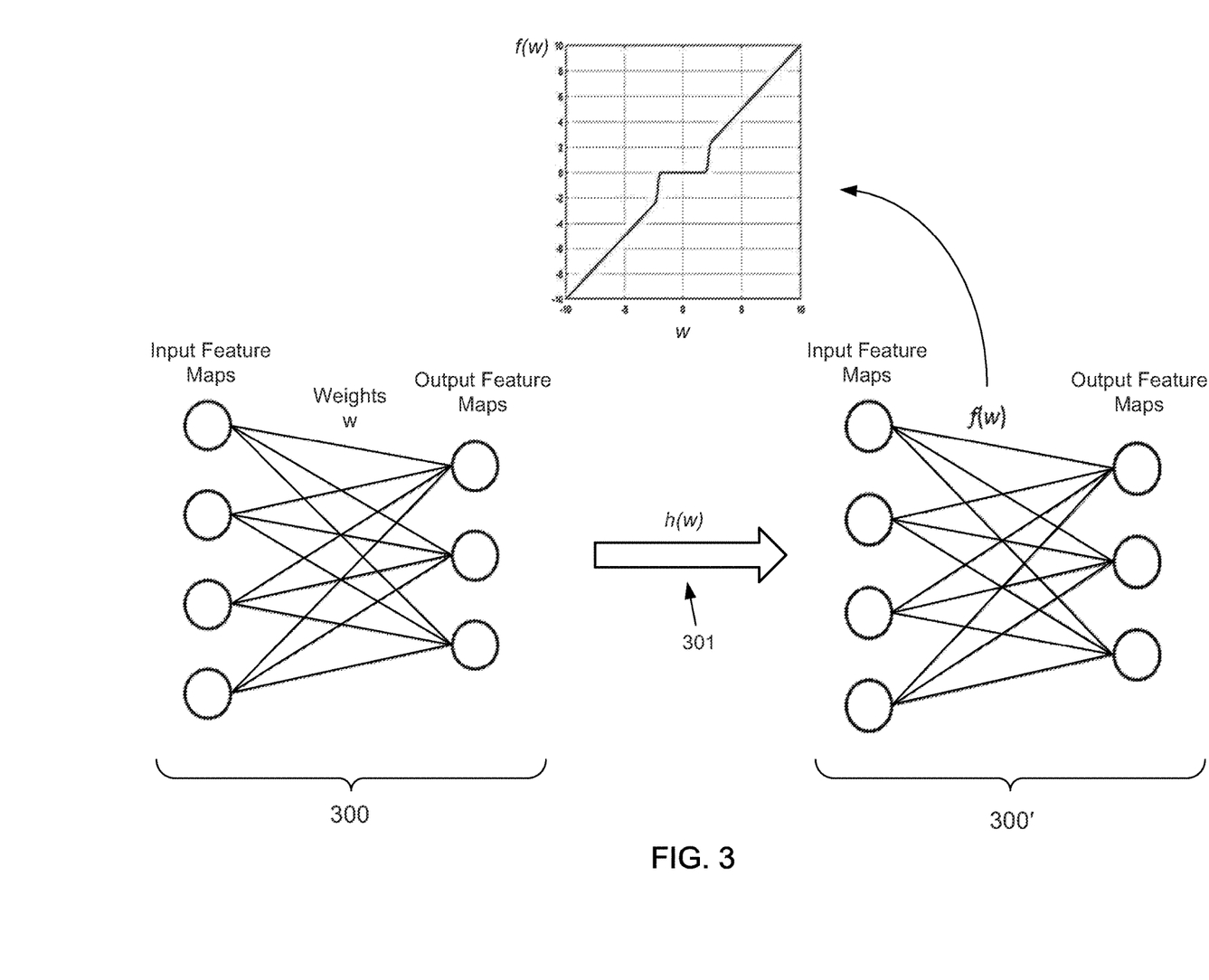
FIG. 3 depicts an example layer in a DNN and application of an analytic threshold function to form an analytic weight function $f(w)$ for optimally pruning the weights of the example layer according to the subject matter disclosed herein.

To prune the weights of a layer of a DNN, each weight may be multiplied by an analytic threshold function h(w) that may be generally characterized as having the qualities of setting the values of weights that have magnitudes less than a threshold to zero without affecting the values of weights having magnitude greater than the threshold. FIG. 3 depicts an example layer 300 in a DNN and application of an analytic threshold function to form an analytic weight function ƒ(w) for optimally pruning the weights of the example layer 300 according to the subject matter disclosed herein. Regardless of the level of complexity of a neural network that may include the example layer 300, an output feature map of the layer 300 may be formed as a sum of products of an input feature map with the connecting weights w to the output feature map, as indicated on the left side of FIG. 3.

The analytic threshold function h(w) may be applied to the weights w of layer 300 at 301 to form a weight function ƒ(w) that replaces the weights w, thereby forming a layer 300'. In one embodiment, each weight w may be multiplied by the analytic function h(w). A graph of an example weight function ƒ(w) is shown at the top center of FIG. 3. In one embodiment, the analytic threshold function h(w) may be $$h(w) = \frac{1}{1+e^{-\beta^2 w^2/\alpha^2}}, \quad (1)$$

in which α is a parameter that controls a sharpness of the threshold function h(w), and β is a parameter that controls a distance (or range) between the first and second edges of the threshold function. The smaller the parameter α, the sharper the profile of h(w), and the smaller the parameter β, the wider the width of h(w). The parameters α and β are scaling values and have no units.

Figure 4A:
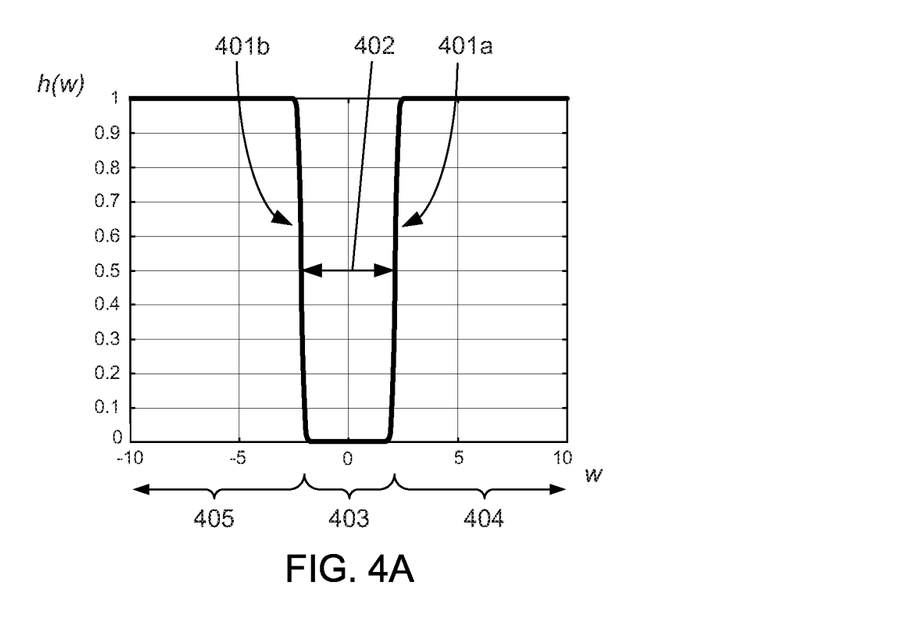
FIG. 4A depicts a graph of the example threshold function $h(w)$ of Eq. (1) according to the subject matter disclosed herein.

FIG. 4A depicts a graph of the example threshold function h(w) of Eq. (1). The parameter α controls a sharpness of the edges 401a and 401b of the threshold function, that is, the parameter α controls a rate of change of the edges 401a and 401b between h(w)=0 and h(w)=1. The parameter β in Eq. (1) controls a width 402 between the two edges 401a and 401b at h(w)=0.5.

As depicted in FIG. 4A, the threshold function h(w) has a value of 0 for a first set 403 of continuous weight values that are centered around 0. Additionally, the threshold function h(w) has a value of 1 for a second set 404 of continuous weight values that are greater than the first set 403 of continuous weight values, and has a value of 1 for a third set 405 of continuous weight values that are less than the first set 403 of weight values. The first edge 401a of the threshold function h(w) is between the first set 403 of continuous weight values and the second set 404 of continuous weight values. The second edge 401b is between the first set 403 of continuous weight values and the third set 405 of continuous weight values.

The values of the threshold function h(w) transition between 0 and 1 in the regions of the first and second edges 401a and 401b. A sharpness of each of the first and second edges 401a and 401b as the threshold function h(w) transitions between 0 and 1 is based on a value of the parameter α (i.e., the sharpness of the edges 401a and 401b of the threshold function h(w)) and a distance 402 between the first and second edges 401a and 401b at h(w)=0.5 is based on a value of the parameter β.

Figure 4B:
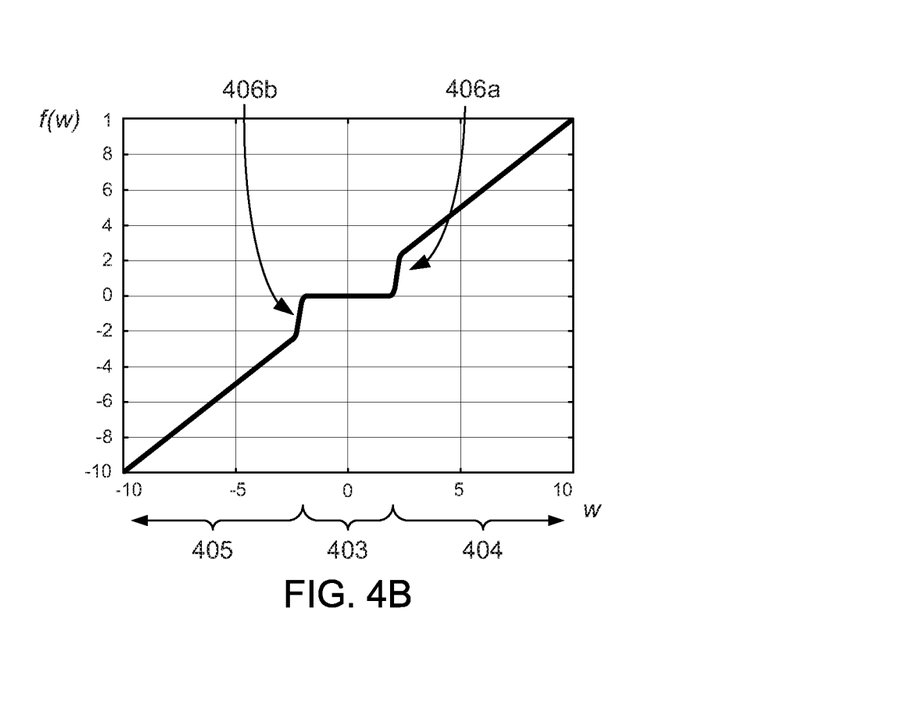
FIG. 4B depicts a graph of the weight function $f(w)$ of Eq. (2) according to the subject matter disclosed herein.

In one embodiment, each of the weights w of a layer may be multiplied by the threshold function h(w) to form a weight function ƒ(w) as, $$f(w) = \frac{w}{1+e^{-\beta^2 w^2/\alpha^2}}. \quad (2)$$

FIG. 4B depicts a graph of the weight function ƒ(w) of Eq. (2). For the first set 403 of weight values, the weight function ƒ(w) has a value of 0. The weight function ƒ(w) has a value of w for the second set 404 of continuous weight values that are greater than the first set 403 of continuous weight values, and has a value of w for the third set 405 of continuous weight values that are less than the first set 403 of weight values. The weight function ƒ(w) includes transition regions 406a and 406b that respectively correspond to the first edge 401a and the second edge 401b. As the value of the parameter α becomes smaller, the first and second edges 401a and 401b become sharper, and the transition regions 406a and 406b become smaller in the w direction.

Figure 5A:
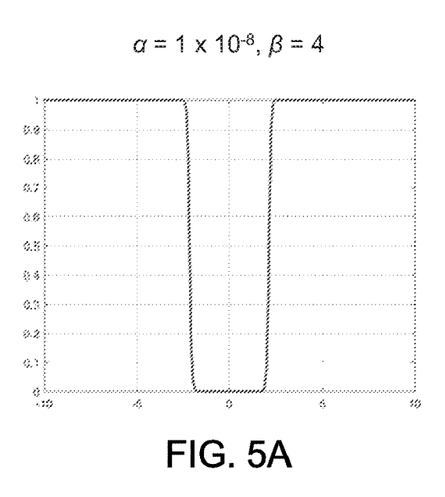
FIGS. 5A-5E depict five example graphs of the threshold function h(w) of Eq. (1) with different values for the parameters α and β to provide a visual sense for how the parameters α and β may affect the threshold function h(w) and the weight function $f(w)$ according to the subject matter disclosed herein.
Figure 5B:
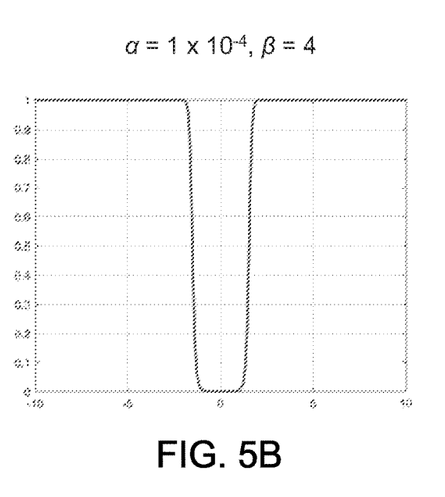
Figure 5C:
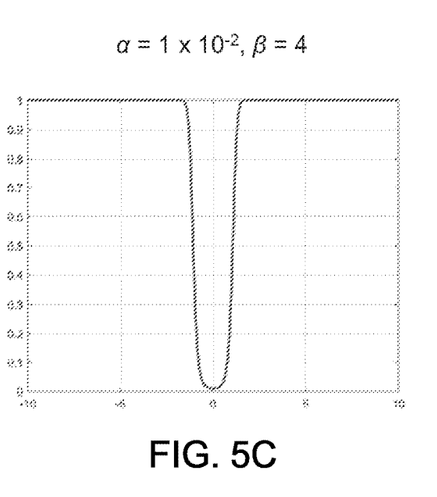
Figure 5D:
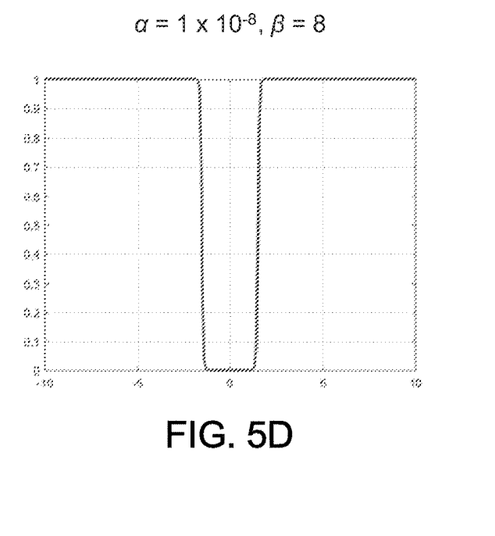
Figure 5E:
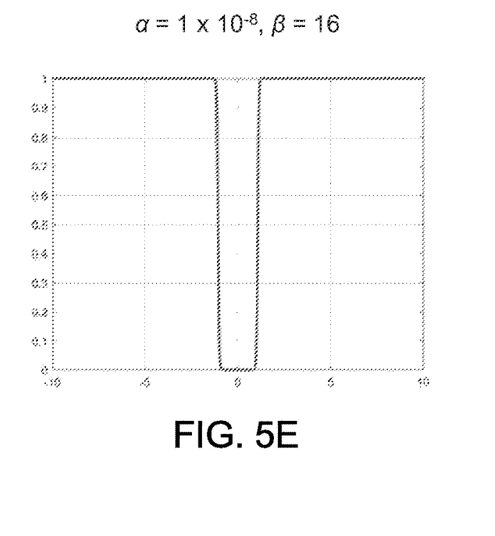

FIGS. 5A-5E depict five example graphs of the threshold function h(w) of Eq. (1) with different values for the parameters α and β to provide a visual sense for how the parameters α and β may affect the threshold function h(w) and the weight function ƒ(w). In FIG. 5A-5C, the parameter α is varied from α=1.0×10$^{-8}$ (FIG. 5A) to α=1.0×10$^{-2}$ (FIG. 5C), while the parameter β is constant at β=4. As can be seen in FIGS. 5A-5C, the smaller the value of α, the sharper the threshold function h(w) transitions between 0 and 1. In FIGS. 5D and 5E, the parameter β is varied from β=8 (FIG. 5D) to β=16 (FIG. 5E), while the parameter α is constant at α=1.0×10$^{-8}$. From FIGS. 5D and 5E, it can be seen that the smaller the parameter β, the greater the width between the edges of the threshold function h(w) at h(w)=0.5. Thus, smaller values of the parameters α and β provide a more robust threshold and a wider width for the threshold function h(w), which in turn provides a relatively greater number of zero weights or, in other words, relatively fewer non-zero weights.

The parameters α and β in the threshold function h(w) may be trainable and optimized. As the parameters α and β become optimized, the shape of the threshold function h(w) converges to have optimally sharp edges and an optimal spacing at h(w)=0.5. The trainability of the parameters α and β provides a significant advantage over other pruning techniques that rely on iterative pruning and re-training because using the threshold function h(w) results in the number of non-zero weights being automatically optimized during back-propagation instead of empirically selecting thresholds to eventually arrive at an acceptable number of non-zero weights in the different layers of a DNN. Optimally reducing the number of non-zero weights, in turn, optimally reduces the computational burden on a device running the DNN.

Returning to the joint pruning and quantization operation 104 in FIG. 1, the pruned weights $w_{l,p}$ of a layer may be determined as, $$w_{l,p} = \frac{w_l}{1 + \exp(-\beta_{l,p}^2 w_l^2)/\alpha_{l,p}^2}, \quad (3)$$

in which $w_l$ are the weights of layer l, $\beta_{l,p}^2$ is a trainable parameter that controls the range of values to be pruned, and $\alpha_{l,p}^2$ is a fixed constant that controls the sharpness of the pruned weights $w_{l,p}$ function. The parameters $\beta_{l,p}^2$ and $\alpha_{l,p}^2$ respectively correspond to the parameters β and α of Eq. (1).

Learning the parameters for quantization of the weighs and the parameters for the quantization of the output feature maps entails finding the number of bits that provides the best balance between accuracy and complexity. Rather than looking for one optimal quantization level, a probability distribution may be used that includes a preference to each available quantization level. The most preferred quantization level receives the highest probability.

To learn the parameters for quantization, the range of allowable quantization levels of the weights may be set as $q_w = q_{w,min}, \ldots, q_{w,max}$. For example, $q_w$ may take the allowable values between 4 and 8 bits. The preferences of the quantization levels for the weights may be represented using a categorical distribution (i.e., a discrete probability distribution) as $$p_{l,w}^{q_w} = \frac{\exp\left(\frac{\alpha_{l,w}^{q_w}}{t_{l,w}}\right)}{\sum_{k=q_{w,min}}^{q_{w,max}} \exp\left(\frac{\alpha_{l,w}^{k}}{t_{l,w}}\right)}, \quad (4)$$

in which $p_{l,w}^{q_w}$ is a number between [0,1] (with 1 representing the highest score a quantization level can achieve), w is a subscript indicating that the probability is associated with the weights, $q_w$ indicates a quantization level (e.g., 5 bits), l denotes the layer of the weights being quantized, $\alpha_{l,w}^{q_w}$ denotes a trainable parameter corresponding to the un-normalized probability of quantization level q, and $t_{l,w}$ is a trainable scaling parameter of the categorical distribution.

Quantization of the weights of a layer is not performed only at one selected quantization level, but instead as a weighted average of all quantization levels as $$w_{l,q} = \sum_{k=q_{w,min}}^{q_{w,max}} \text{dequant}_k[\text{quant}_k(w_{l,p})] \times p_{l,w}^k, \quad (5)$$

in which $w_{l,q}$ is the quantized-dequantized weights for layer l, $\text{quant}_k$ is a quantization of the weights at k bits, and $\text{dequant}_k$ is a dequantization of the weights at k bits.

The pre-quantized output feature maps for the layer are computed using the quantized weights as determined by Eq. (5). Similar to the weights, the range of allowable quantization levels of the output feature maps may be set as $q_f = q_{f,min}, \ldots, q_{f,max}$, and the preference of a quantization level for the output feature maps may be represented using a categorical distribution as $$p_{l,f}^{q_f} = \frac{\exp\left(\frac{\alpha_{l,f}^{q_f}}{t_{l,f}}\right)}{\sum_{k=q_{f,min}}^{q_{f,max}} \exp\left(\frac{\alpha_{l,f}^{k}}{t_{l,f}}\right)}, \quad (6)$$

in which $p_{l,f}^{q_f}$ is a number between [0,1] (with 1 representing the highest score a quantization level can achieve), ƒ is a subscript indicating that the probability is associated with the feature maps, $q_f$ indicates a quantization level, l denotes the layer of the feature maps being quantized, $\alpha_{l,f}^{q_f}$ denotes a trainable parameter corresponding to the un-normalized probability of quantization level q, and $t_{l,f}$ is a trainable scaling parameter of the categorical distribution.

The output feature maps are also not quantized at just one selected quantization level, but instead as a weighted average of all quantization levels as $$ƒ_{l,q} = \sum_{k=q_{f,min}}^{q_{f,max}} \text{dequant}_k[\text{quant}_k(ƒ_l)] \times p_{l,f}^k, \quad (6)$$

in which $ƒ_{l,q}$ is the quantized-dequantized output feature maps for layer l, $\text{quant}_k$ is a quantization of the output feature maps at k bits, and $\text{dequant}_k$ is a dequantization of the output feature maps at k bits.

In addition to the trainable weights of a layer, the trainable parameters for each layer l include the pruning parameters $\beta_{l,p}$, the un-normalized probabilities $\alpha_{l,w}^{q_w}$ and $\alpha_{l,f}^{q_f}$ for each quantization level, and the scaling parameters of the distribution $t_{l,w}$ and $t_{l,f}$.

For a DNN that is pruned and quantized in a conventional manner (i.e., pruning and quantizing being separate independent operations), the total loss E(w) may be defined as $$E(w) = \frac{1}{N}\sum_{n=1}^{N} E_c(w) + \lambda_r E(w), \qquad (8)$$

in which $E_c$ is the cross-entropy loss and $E_r$ is the L2 regularization on the weights.

For the joint pruning and quantizing operation 104 in FIG. 1, three pruning losses may be included in a cost function. A pruning loss $E_p = \sum_{l=1}^{L} \beta_{l,p}^2$, in which L is the maximum number of layers, may be added that helps β to be small, and in effect increases pruning. The pruning loss $E_p$, however, may have a negative effect on the cross-entropy loss $E_c$ of Eq. (8), so the two terms should be balanced.

A weight quantization loss $E_{w,q} = \sum_{l=1}^{L} \sum_{k=q_{w,min}}^{w_{w,max}} k \times p_{l,w}^k$ may be added that helps the optimization to place all the probability mass on the smallest quantization level. Doing so may also negatively affect the cross-entropy loss $E_c$.

A feature map quantization loss $E_{f,q} = \sum_{l=1}^{L} \sum_{k=q_{f,min}}^{q_{f,max}} k \times p_{l,f}^k$ may be added that operates in the same manner as the weight quantization loss $E_{w,q}$.

The cost function that may be optimized during a backward pass of the joint pruning and quantizing operation may be $$E(w) = \frac{1}{N}\sum_{n=1}^{N} E_c(w) + \lambda_r E_r(w) + \lambda_p E_p(w) + \lambda_{w,q} E_{w,q}(w) + \lambda_{f,q} E_{f,q}(w), \qquad (9)$$

in which N is the size of a mini batch that may be manually set beforehand and may be a number, such as, but not limited to 32, 64, 128 or 256, and the constants $\lambda_r$, $\lambda_p$, $\lambda_{w,q}$ and $\lambda_{f,q}$ may be determined by a grid-based parameter optimization or, alternatively, by a random search.

Figure 6:
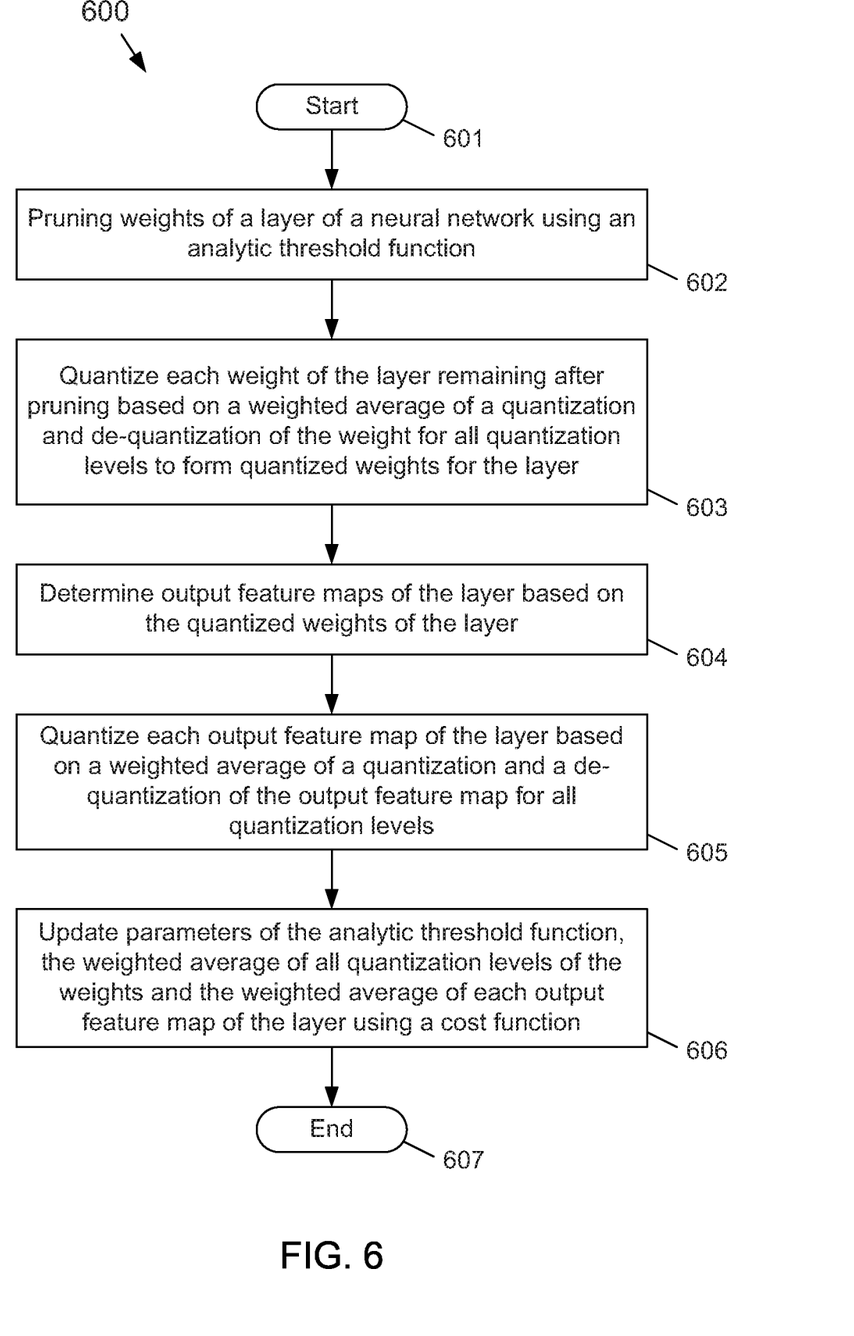
FIG. 6 is a flow chart of an example embodiment of a method for performing a joint pruning and quantization operation on the layers of a neural network, such as a DNN, according to the subject matter disclosed herein.

FIG. 6 is a flow chart of an example embodiment of a method 600 for performing a joint pruning and quantization operation on the layers of a neural network, such as a DNN, according to the subject matter disclosed herein. For one layer, the process starts at 601. At 602, the weights of the layer are pruned using an analytic threshold function, such as, but not limited to, the analytic threshold function of Eq. (1). At 603, each weight of the layer that remains after pruning is quantized based on a weighted average of a quantization and dequantization of the weight for all quantization levels to form quantized weights for the layer. At 604, output feature maps for the layer are determined, or calculated, using the quantized weights formed in 603. At 605, each output feature map of the layer is quantized based on a quantization and dequantization of the output feature map for all quantization levels. At 606, parameters of the analytic function, the weighted average of all quantization levels of the weights and the weighted average of all quantization levels of the output feature maps are updated using a cost function. At 607, the method 600 for the layer ends. The method 600 may be iteratively performed for a given layer of a neural network. Additionally, the method 600 may be performed on one or more of the layers of a neural network.

Figure 7:
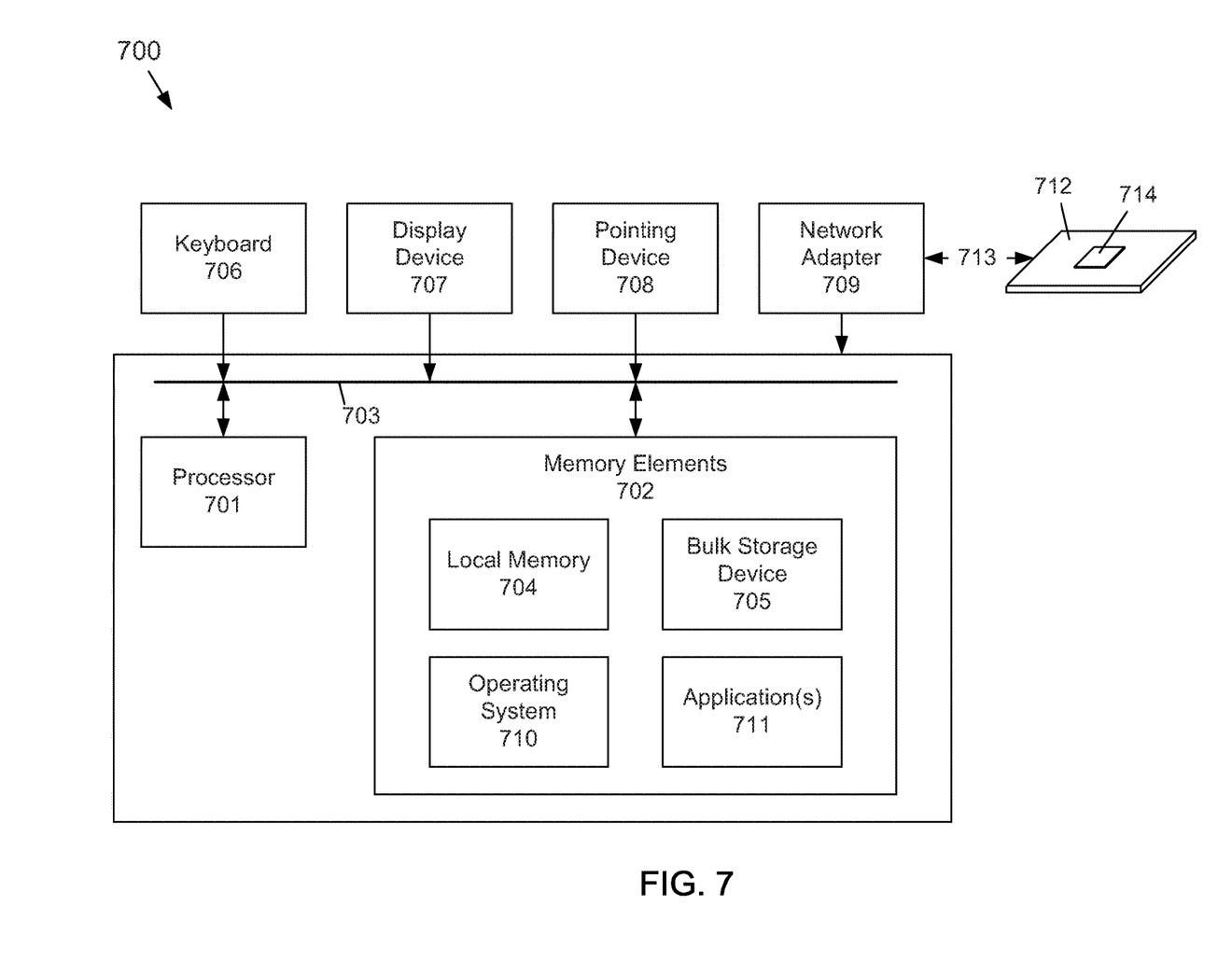
FIG. 7 depicts a block diagram of an exemplary architecture for a data processing system that may be used to implement neural network analyzer of FIG. 1.

FIG. 7 depicts a block diagram of an exemplary architecture 700 for a data processing system. In one embodiment, the architecture 700 may be used to implement neural network analyzer 100 of FIG. 1.

The architecture 700 includes at least one processor, e.g., a central processing unit (CPU) 701 coupled to memory elements 702 through a system bus 703 or other suitable circuitry. The architecture 700 may store program code within the memory elements 702. The processor 701 may execute the program code accessed from the memory elements 702 via system bus 703. As such, processor 701 may serve as a special processor. The memory elements 702 may include one or more physical memory devices such as, but not limited to, a local memory 704 and one or more bulk storage devices 705. The local memory 704 may be a random access memory (RAM) or other non-persistent memory device(s) generally used during actual execution of the program code. The bulk storage device 705 may be implemented as a hard disk drive (HDD), solid-state drive (SSD), and/or other persistent data storage device. The architecture 700 may also include one or more cache memories (not shown) that provide temporary storage of at least some program code in order to reduce the number of times program code must be retrieved from bulk storage device 705 during execution.

The architecture 700 may also include input/output (I/O) devices, such as a keyboard 706, a display device 707, and/or a pointing device 708 that may optionally be coupled to the architecture 700. In some embodiments, one or more of the I/O devices may be combined as in a touchscreen that is used as display device 707. Such a display device 707 may also include a keyboard 706 and pointing device 708. One or more network adapters 709 may also be coupled to the architecture 700 to enable the architecture 700 to become coupled to other systems, computer systems, remote printers, and/or remote storage devices through intervening private or public networks. Modems, cable modems, Ethernet cards, and wireless transceivers are non-limiting examples of different types of network adapters that may be used with the architecture 700. Depending upon the particular device implemented with the architecture 700, the specific type of network adapter, or network adapters may vary as the case may be. The I/O devices may be coupled to the architecture 700 either directly or through intervening I/O controllers.

As depicted in FIG. 7, the memory elements 702 may store an operating system 710 and one or more applications 711. In one aspect, the operating system 710 and the application(s) 711, being implemented in the form of executable program code, may be executed by the architecture 700. As such, the operating system 710 and the application(s) 711 may be considered an integrated part of the architecture 700. The operating system 710, the application(s) 711, and any data items used, generated, and/or operated upon by the architecture 700 may be functional data structures that impart functionality when employed as part of a system implemented using the architecture 700.

In one arrangement, an application 711 may include one or more modules that when executed by a system using the architecture 700 or an architecture similar to the architecture 700, may perform the various operations described herein with reference to FIGS. 1 and 3-6.

In another arrangement, the architecture 700 may be coupled to a platform 712 through a communication link 713. In one example, the architecture 700 may be coupled to the platform 712 through a network adapter 709. In another example, the architecture 700 may include one or more other I/O devices, such as Universal Serial Bus (USB) interface, or other communication port, that may be used to couple the architecture 700 to the platform 712. The platform 712 may be a circuit board and have a neural network accelerator 714 coupled thereto. In one arrangement, the neural network accelerator 714 may be implemented as an integrated circuit (IC) or a plurality of ICs. For example, neural network accelerator 714 may be implemented as one or more programmable ICs, such as field programmable gate arrays, one or more application-specific ICs (ASICs), or the like.

Architecture 700 may be configured to perform the operations described herein on a neural network or a DNN to generate a pruned and quantized network, such as the pruned and quantized network 102 in FIG. 1. That is, the architecture 700 may receive the trained neural network 101 through an I/O device, operate on one or more layers of the trained neural network, and output through an I/O device a trained neural network having one or more layers that have weights and output feature maps that have been jointly pruned and quantized according to the subject matter disclosed herein. The architecture 700 further may provide a definition of the pruned and quantized network 102 to neural network accelerator 714 for execution therein.

FIG. 75 is provided for purposes of illustration only and, as such, is not intended as a limitation of the inventive arrangements described herein. In some cases, the particular system implemented using the architecture 700 may include fewer components or more components than shown. Further, the particular operating system and/or application(s) included as part of the architecture 700 may vary.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A neural network, comprising:
a plurality of layers, at least one layer comprising jointly pruned and quantized weights and output feature maps, the jointly pruned weights being pruned using an analytic threshold function, each weight remaining after being pruned further being quantized based on a weighted average of a quantization and dequantization of the weight for all quantization levels, and the output feature maps being formed based on the pruned and quantized weights of the layer, each output feature map being quantized based on a weighted average of a quantization and dequantization of the output feature map for all quantization levels, and parameters of the analytic threshold function, the weighted average of all quantization levels of the weights and the weighted average of each output feature map of the layer being updated based on a cost function.

2. The neural network of claim 1, wherein the neural network is a full-precision trained neural network before the weights and the output feature maps of the at least one layer are jointly pruned and quantized.

3. The neural network of claim 1, wherein the cost function includes a pruning loss term, a weight quantization loss term and a feature map quantization loss term.

4. The neural network of claim 3, wherein the parameters of the analytic threshold function, the weighted average of all quantization levels of the weights and the weighted average of each output feature map of the layer are updated based on an optimization of the cost function.

5. The neural network of claim 3, wherein the parameters of the analytic threshold function, the weighted average of all quantization levels of the weights and the weighted average of each output feature map of the layer are iteratively updated based on an optimization of the cost function.

6. The neural network of claim 1, wherein the parameters of the analytic threshold function include a first parameter that controls a sharpness of the analytic threshold function, and second parameter that controls a distance between a first edge and a second edge of the analytic threshold function.

7. A method to prune weights and output feature maps of a layer of a neural network, the method comprising:
pruning weights of a layer of a neural network using an analytic threshold function, the neural network being a trained neural network;
quantizing each weight of the layer remaining after pruning based on a weighted average of a quantization and dequantization of the weight for all quantization levels to form quantized weights for the layer;
determining output feature maps of the layer based on the quantized weights of the layer;
quantizing each output feature map of the layer based on a weighted average of a quantization and dequantization of the output feature map for all quantization levels; and
updating parameters of the analytic threshold function, the weighted average of all quantization levels of the weights and the weighted average of each output feature map of the layer using a cost function.

8. The method of claim 7, wherein updating the parameters of the analytic threshold function, the weighted average of all quantization levels of the weights and the weighted average of each output feature map of the layer further comprises optimizing the cost function.

9. The method of claim 8, wherein the cost function includes a pruning loss term, a weight quantization loss term and a feature map quantization loss term.

10. The method of claim 7, further comprising iteratively pruning the weights, quantizing each weight of the layer, determining the output feature maps of the layer, quantizing each output feature map of the layer, and updating the parameters of the analytic threshold function, the weighted average of all quantization levels of the weights and the weighted average of each output feature map of the layer to optimize the cost function.

11. The method of claim 10, wherein the layer of the neural network is a first layer,
the method further comprising:
pruning weights of a second layer of the neural network using the analytic threshold function, the second layer being subsequent to the first layer in the neural network;
quantizing each weight of the second layer remaining after pruning based on a weighted average of a quantization and dequantization of the weight for all quantization levels to form quantized weights for the second layer;
determining the output feature maps of the second layer based on the quantized weights of the second layer;
quantizing each output feature map of the second layer based on a weighted average of a quantization and a dequantization of the output feature map for all quantization levels; and
updating parameters of the analytic threshold function, the weighted average of all quantization levels of the weights and the weighted average of each output feature map of the second layer using the cost function.

12. The method of claim 11, wherein updating the parameters of the analytic threshold function, the weighted average of all quantization levels of the weights and the weighted average of each output feature map of the second layer further comprises optimizing the cost function.

13. The method of claim 7, wherein the parameters of the analytic threshold function include a first parameter that controls a sharpness of the analytic threshold function, and second parameter that controls a distance between a first edge and a second edge of the analytic threshold function.

14. A neural network analyzer, comprising:
an interface that receives a neural network, the neural network comprising a plurality of layers; and
a processing device that generates a neural network comprising at least one layer having weights and output feature maps that have been jointly pruned and quantized, the processing device pruning the weights of the at least one layer of the neural network using an analytic threshold function, quantizing each weight of the at least one layer remaining after pruning based on a weighted average of a quantization and dequantization of the weight for all quantization levels to form quantized weights for the at least one layer, determining output feature maps of the at least one layer based on the quantized weights of the at least one layer, quantizing each output feature map of the at least one layer based on a weighted average of a quantization and dequantization of the output feature map for all quantization levels, and updating parameters of the analytic threshold function, the weighted average of all quantization levels of the weights and the weighted average of each output feature map of the at least one layer using a cost function.

15. The neural network analyzer of claim 14, wherein the interface further outputs the neural network comprising at least one layer having weights and output feature maps that have been jointly pruned and quantized.

16. The neural network analyzer of claim 14, wherein the neural network is a full-precision trained neural network before the weights and the output feature maps of the at least one layer are jointly pruned and quantized.

17. The neural network analyzer of claim 14, wherein the cost function includes a pruning loss term, a weight quantization loss term and a feature map quantization loss term.

18. The neural network analyzer of claim 17, wherein the parameters of the analytic threshold function, the weighted average of all quantization levels of the weights and the weighted average of each output feature map of the at least one layer are updated based on an optimization of the cost function.

19. The neural network analyzer of claim 17, wherein the parameters of the analytic threshold function, the weighted average of all quantization levels of the weights and the weighted average of each output feature map of the at least one layer are iteratively updated based on an optimization of the cost function.

20. The neural network analyzer of claim 14, wherein the parameters of the analytic threshold function include a first parameter that controls a sharpness of the analytic threshold function, and second parameter that controls a distance between a first edge and a second edge of the analytic threshold function.

* * * * *